United States Patent [19]

Carter

[11] Patent Number: 4,549,775
[45] Date of Patent: Oct. 29, 1985

[54] TAPE CASSETTE HOLDER

[75] Inventor: Donald F. Carter, South Pasadena, Calif.

[73] Assignee: Anthony J. Foto, Pasadena, Calif.

[21] Appl. No.: 443,020

[22] Filed: Nov. 19, 1982

[51] Int. Cl.$^4$ ............................................. B65D 85/672
[52] U.S. Cl. ........................................ 312/15; 312/12; 312/13
[58] Field of Search ...................... 312/13, 14, 15, 18; 206/387; 267/150, 159, 165; 221/87

[56] References Cited

U.S. PATENT DOCUMENTS 2,718,964  9/1955  Kilgore ............................... 267/165

FOREIGN PATENT DOCUMENTS 492547   4/1977  Australia ............................ 206/387
2317184  2/1977  France ................................ 206/387

Primary Examiner—James T. McCall
Assistant Examiner—Joseph Falk
Attorney, Agent, or Firm—Christie, Parker & Hale

[57] ABSTRACT

A cassette holder has multiple compartments; each compartment has a leaf spring for urging a cassette into one or the other of two stable positions. The first stable position, a cassette stored position, has the spring bearing on top of a cassette and forcing the cassette tightly against the bottom of a compartment. The second position, a cassette removal position, has the spring bearing against the upper back wall of a cassette to maintain the cassette canted with an upper corner protruding from the compartment for ease of grasping by a user. A pivot at the junction of a pocket and an upper section of the back wall of each compartment rotates a cassette to the removal position upon the application of finger pressure on the bottom of the cassette. A second pivot in the form of a foot at the entrance of each cassette causes the cassettes to pivot out of the compartment on being pulled and prevents a cassette from being pulled directly out of a compartment. Interlocking tenon and mortises permits modular buildup of several holders.

12 Claims, 6 Drawing Figures

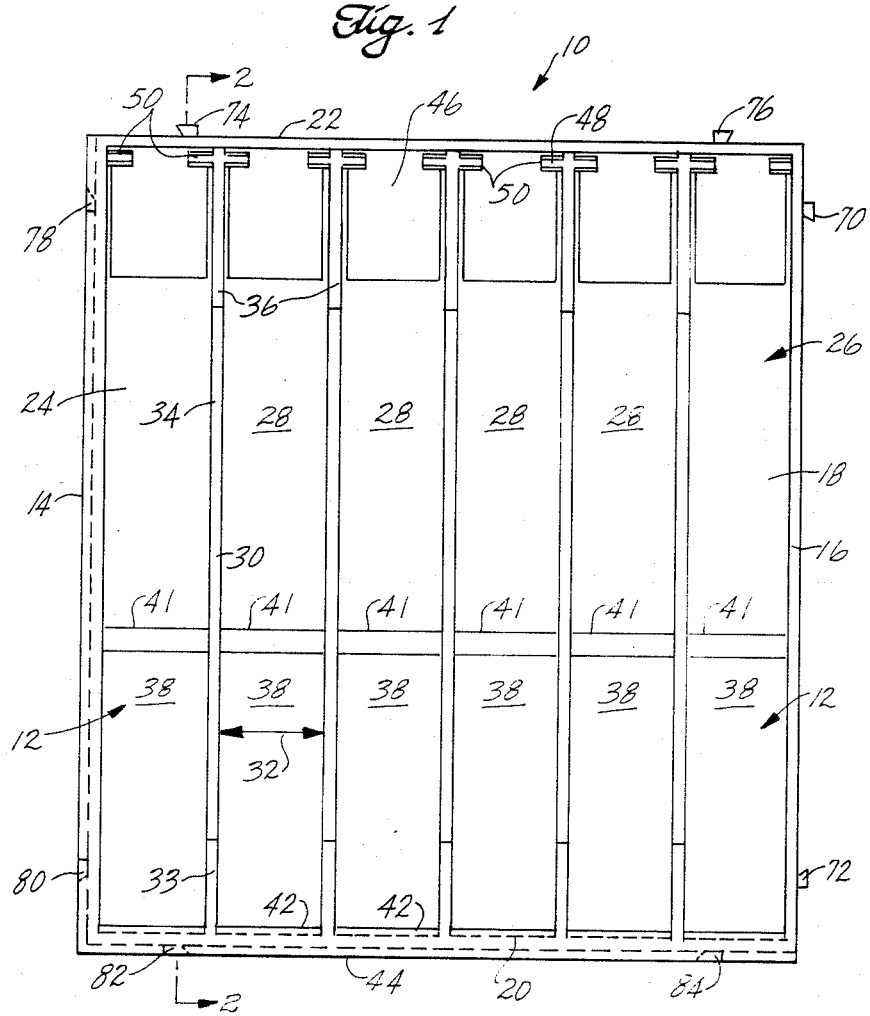

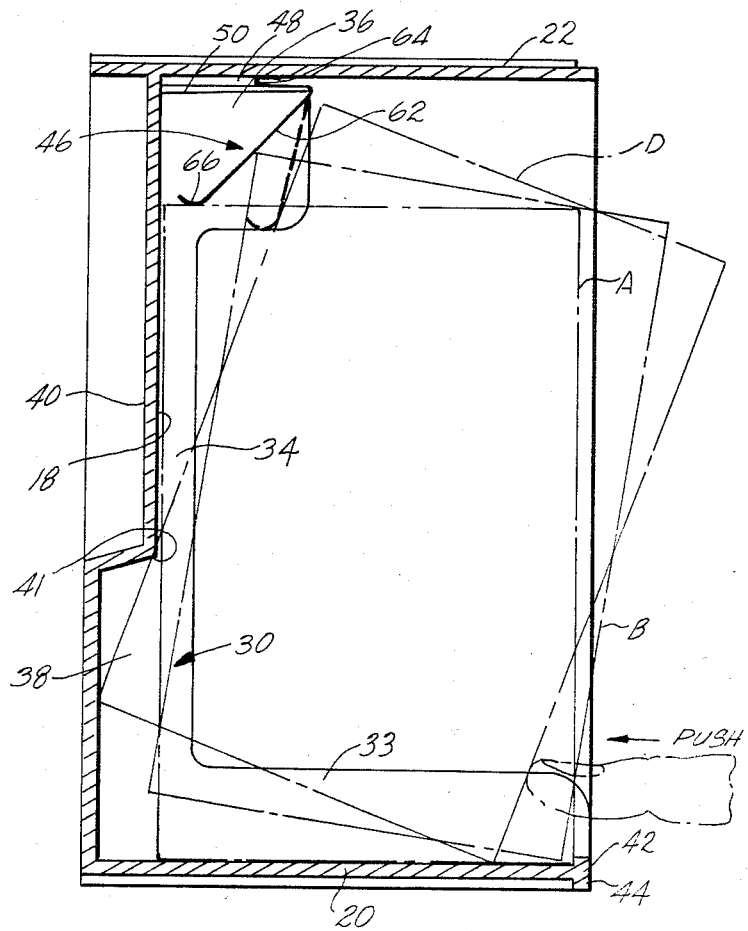
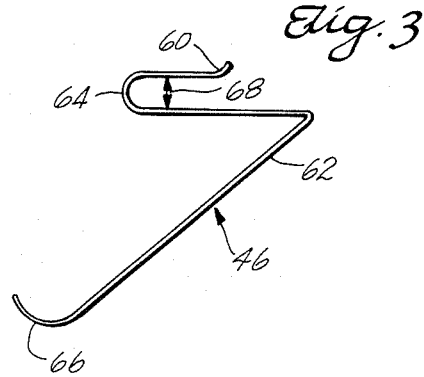

TAPE CASSETTE HOLDER

BACKGROUND OF THE INVENTION

The present invention relates to cassette tape storage devices and, in particular, to multiple compartment storage devices.

Cassette tapes have become increasingly popular. They are used in a variety of ways: to record music, as educational material, and as personal records, to name only a few. These cassettes have standardized exterior dimensions.

Cassette storage devices formed of a number of individual cassette storage compartments have been known for some time.

A problem with known cassette storage devices is in keeping the cassette tapes firmly in place so that they do not fall out when the devices are moved. Covers make access to the cassettes a bother. When in a vehicle, unless the cassettes are held firmly in place, they can rattle.

Gaining access to the tape cassettes can be difficult. Storage should be compact and the individual cassettes are thin, and so the tendency in design is to rack the cassettes very close together. Pulling the cassettes out of storage can be hard to do because neighboring cassettes can interfere with the removal of the desired cassette.

Attempts have been made to provide stackable and removably interlocking containers. One such unit is described by Shewchuk in U.S. Pat. No. 3,514,170. Shewchuck describes a multiple compartment container capable of slidably interlocking with identical units with dovetails. The container has a rectangular cross section and has rectangular projections or tenons on each of two adjacent outer surfaces and mating rectangular recesses on the other two outer surfaces. The dovetail keeps the units from pulling apart.

The containers described in Shewchuk contemplate the use of a storage drawer for each container. A user partially removes a drawer in order to insert or remove contents from the drawer.

SUMMARY OF THE INVENTION

The present invention is characterized by a multiple compartment cassette holder that employs a spring in each compartment that holds a cassette in either of two stable positions: the first securely in place, the second, slightly outward of the holder for ease in grasping the cassette. The holder of the invention can be adapted for interlocking with others of the holders to increase storage.

Briefly stated, the holder of this invention includes a plurality of compartments for receiving and storing a cassette. A spring at an interior wall of each compartment urges a cassette tightly against an opposite wall during storage. In a second position the spring keeps a portion of the cassette slightly outward of the compartment (by bearing on the back wall of the cassette).

In the second position, the cassette is loosely contained in the compartment.

Preferably, upon partial withdrawal of a cassette from a compartment, the spring shifts its bearing to the rear wall of the cassette and applies an outward force to the cassette to move it slightly outward from the compartment. A pivot forces the cassette to pivot or cant about the pivot to present a corner that is easily grasped. During insertion, the cassette may initially take the same posture so that tentative compartments can be chosen. When the cassette is pushed firmly inward the spring if forced to bear on a different wall of the cassette to positively force the cassette against an opposite wall.

In preferred form, the present invention contemplates a cassette holder having a plurality of compartments. Each compartment has a leaf spring at its top. Each spring has a free end capable of engaging an upper wall or a back wall of a cassette for storage and removal, respectively. Viewed from the side, each spring extends downwardly and rearwardly from its mount. A pivot, preferably a step, at the front and bottom of each compartment cooperates with the leaf spring to develop a removal position of a cassette having an upper corner extending from the top of the holder. In this position, the corner of the cassette is presented for pulling the cassette completely out of the holder. Adjacent compartments are separated by a partial wall barrier that parallels the major plane of the compartment while leaving a considerable free space between adjacent compartments for ease in getting fingers around a cassette. A bottom barrier of the wall extends the full depth of the compartment to guide cassettes into and out of the compartment. An upper barrier of the wall extends sufficiently far from the rear wall to present a guide and barrier when the cassette is canted forward and a top corner of it moves away from the rear of the compartment. A middle barrier of the wall extends only slightly outwardly from the rear of the compartment. A pocket at the bottom of the rear wall provides clearance for a corner of the cassette during removal from and insertion into the compartment. A pivot is defined by this pocket and the rear wall at a junction between the two. The pivot produces rotation of a cassette with sufficient finger pressure applied at the bottom towards the withdrawal position.

As a feature of the invention, the holders are rectangular and the outer wall surfaces have mortises and tenons adapted for interconnection so that a plurality of containers may be interconnected in a row-and-column arrangement. Preferably, there are two mortises on each of two adjacent outer walls and there are two tenons on each of the other two outer walls.

These and other features, aspects and advantages of the present invention will become more apparent from the following description, appended claims and drawings.

BRIEF DESCRIPTION OF THE DRAWINGS

FIG. 1 is a front elevation view of a holder according to the preferred embodiment of the present invention;

FIG. 2 is a view taken along line 2—2 of FIG. 1 showing a cassette in chain dash lines;

FIG. 3 is a side elevational view of one of the springs shown in FIGS. 1 and 2;

DESCRIPTION OF THE PREFERRED EMBODIMENTS

Figure 4:
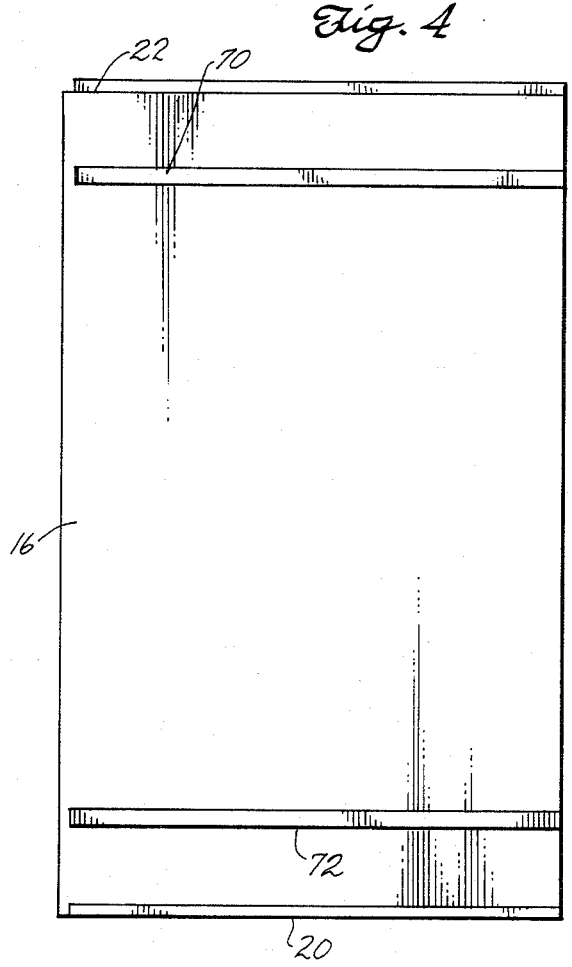
FIG. 4 is a side elevation view of the holder of FIG. 1.

FIG. 1 shows in front elevation a holder 10 according to the preferred embodiment of the present invention.

Holder 10 has a plurality of cassette receiving compartments 12. The holder is rectangular parallelepiped. It has vertical side walls 14 and 16 and a back wall 18. It has a horizontal floor 20 and a horizontal roof 22. The holder is generally open in the front for placement and removal of tape cassettes.

Each of the compartments 12 is of similar design. Outer compartments 24 and 26 differ from the inner compartments, shown at 28, only in that each outer compartment has a complete side wall on its outer side coextensive with the side of the compartment, whereas the inner compartments open into one another across incomplete wall barriers.

With reference to FIG. 2, each compartment permits a standard tape cassette to occupy either of two stable positions: first, completely in the compartment, as shown by the chain dash lines in depiction "A", and second, canted with an upper corner of the cassette extending outward from the compartment as shown by the chain dash line depiction "B". Each inner compartment 28 is bounded on its sides by a pair of vertical, recessed, contoured, and spaced-apart interior barrier walls 30. Spacing 32 between adjacent interior walls accommodates the thickness of a cassette that will be stored in the holder.

The recessed shape of interior barrier walls 30 eliminates interference to a user when attempting to withdraw a cassette from a compartment.

As indicated in FIG. 2, interior barrier 30 has a bottom barrier 33 that is integral with floor 20 and extends continuously from the front of the holder towards the back. Barrier 33 has a limited height, enough to constrain the cassette from sideways displacement into an adjacent compartment during both storage of a cassette and its insertion and removal from a compartment. Barrier 33 is much lower than the height of a compartment. Barrier wall 30 also has a vertically extending, continuous barrier 34 that is integral with and extends up back wall 18. Barrier 34 merges into barrier 33 towards the bottom of a compartment and the two present a continuous, hollow barrier from the front of the holder to its back wall 18 and from floor 20 upwards to a point slightly below the in-compartment height of a cassette. Barrier 34 at its top meets a comparatively deep barrier 36. Barrier 36 extends outward towards the entrance to the compartment and above the in-compartment height of a cassette. As can be seen by the chain dash line depiction "A" of a cassette in a stored position, this extension of the wall provides for sideways constraint of the cassette at the top of the cassette. As can be seen by chain dash line depiction "B" of the cassette, during removal barrier 36 still constrains the cassette in one of its two stable positions. Barrier 36 is integral with back wall 18 and with roof 22. There is adequate space between the top of a cassette and the roof to insert a finger for pulling the cassette forward about a pivot.

Bottom barrier 33 then serves to guide a cassette into and out of a compartment and to constrain the cassette from sideways displacement, especially at the front of the cassette. Vertical barrier 34 restrains the cassette from sideways displacement and upper barrier 36 does the same thing in both of the cassettes' stable positions.

A pocket 38 formed in rear wall 18 permits some freedom for the rear lower corner of a cassette during removal of the cassette from the compartment. When a cassette is stored, a section 40 of wall 18 bears on the rear wall of the cassette to locate it in the compartment. More specifically, pocket 38 and section 40 define a pivot 41 for the cassette. When pushed at the bottom, a cassette pivots clockwise about pivot 41 to the orientation shown by the chain dashed lines denominated "D".

Each compartment 12 has an upstanding, projecting step 42 and a foot 44, both extending from floor 20. Step 42 acts as a stop and a pivot for the cassette. Step 42 aids in keeping a cassette in a stored position by bearing on a front wall of the cassette, and during removal the step causes the cassette to pivot about it as the cassette is pulled from the compartment. Foot 44 provides bearing at the front of the holder.

A spring 46 is mounted on an upper portion (as viewed in FIG. 1) of each of the compartments 12 in a spring receiving slot 48. Slot 48 is defined by a pair of facing projections 50 and a portion of roof 22. Each of the projections extends outward from its wall 36 toward the complementary projection. The projections are tapered back-to-front and each projection extends to rear wall 18.

Spring 46 (most clearly shown in FIG. 3) has a crimped end 60, a loop portion 64, a straight, angled back reentrant portion 62, and a pressure applying, rounded end 66. The loop portion has a C-shaped contour with legs separated by vertical gap 68. Gap 68 is slightly greater than the depth of slot 48 so that the legs are compressed in the slot and bear tightly against the slot walls. Loop portion 64 wedges between the walls of slot 48. The spring's crimped end wedges tightly against roof 22. The crimped end has a rake that opposes removal of the spring once inserted in the slot by gripping the roof.

Referring again to FIG. 2, a cassette cartridge "A" is stored in a holder compartment 12. In the stored condition, spring 46 at its pressure-applying end 66 urges the cassette downward against floor 20. The cassette is restrained from sliding out of the compartment by interference between it and step 42 with the lower front edge of the cassette. In the stored condition, the rear of the cassette may rest against compartment rear wall section 40. As previously pointed out, rear wall 18 steps out to define a pocket and clearance for the lower rear edge of the cassette. Upon partial withdrawal of the cassette (shown at B), the spring's straight portion 62 shifts its bearing from the top to the back of the cassette. The spring bearing on the back of the cassette urges the top of the cassette slightly out of the compartment. The lower portion of the cassette contacts and pivots about step 42 at this time. The orientation of the cassette is shown by chain dashed depiction "B".

Spring 46, then, serves two functions. In stored position A of the cassette, the spring urges against the top of the cassette and pushes the cassette against the floor of the holder. In this position the cassette is positively locked in place by spring pressure and interference with step 42, and will not rattle. Upon rotating the upper end of the cassette forward by finger pressure applied at the bottom of the cassette the upper rear corner of the cassette clears end 66 of the spring; the spring then bears against the back of the cassette to resist a return to the stored position and cants the cassette about the pivot of step 42. In this canted position, the cassette can be temporarily stored, as during organizing, or it can be pulled completely out of the holder.

The spring, then, effects two stable positions for the cassette, the stored, and the canted positions.

Holders can interlock to increase storage. Referring again to FIG. 1, a pair of tenons 70 and 72 project outward from the outer surface of vertical wall 16. Tenons 70 and 72 are parallel (as shown in FIG. 4) to roof and floor 22 and 20. The tenons extend almost the entire distance between the front and rear ends of holder 10. A corresponding pair of tenons 74 and 76 project outwardly from the outside surface of roof 22 in a manner similar to tenons 70 and 72.

A pair of mortises 78 and 80 are disposed along and within the vertical wall 14, the mortises being parallel to roof 22 and floor 20. A pair of mortises 82 and 84 are similarly disposed along and within floor 20, such mortises being parallel to vertical walls 14 and 16.

The tenons and the mortises are provided for interlocking a plurality of holders 10 together. To this end, the tenons are located so as to interlock with a corresponding mortise in an adjacent holder. More specifically, tenon 70, for example, is located downward (as viewed in FIG. 1) from roof 22 the same distance as mortise 78. Similarly, tenon 72 is positioned upward from floor 20, the same distance as mortise 80. Correspondingly, tenon 74 can register with mortise 82, and tenon 76 can register with mortise 84 of a different holder.

The cross sections of a tenon and mortise are substantially the same. As shown in FIG. 1, the mortise and tenons have a general dovetail shape. The size of the mortise permits a corresponding tenon to slide within the groove defining the mortise until the holders are fastened completely together. The tenons and mortises do not extend completely across the holder. This provides a stop so that the faces of attached holders are flush when the tenons abut the stops. Although the tenons and mortises, as shown in FIG. 1, have a dovetail shape, it is to be understood by those skilled in the art that any one of a number of shapes may be used.

By virtue of the placement of the tenons and mortises on respective walls of the holder, a plurality of holders may be interlocked in a checkerboard or row-and-column fashion. Thus, a combination of holders in any one of a number of row-and-column configurations, and even with holders absent, is possible.

Figure 5:
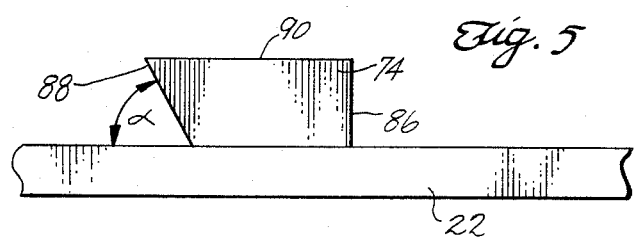
FIG. 5 is an enlarged view of one of the tenons shown in FIG. 1 viewed from the front of the holder.
Figure 6:
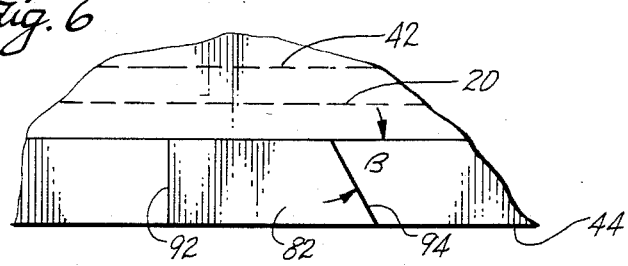
FIG. 6 is an enlarged sectional view of one of the mortises shown in FIG. 1 viewed from the back of the holder.

Referring to FIGS. 5 and 6, enlarged views of a tenon and a corresponding mortise are shown. FIG. 5 views the tenon from the front of the holder and FIG. 6 views the mortise from the rear of the holder. Tenon 74 is in the general shape of a trapezoid having a side 86 normal to roof 22 and a side 88 at an acute angle $\alpha$ with roof 22. Tenon 74 has an upper surface 90 that lies parallel to roof 22.

Mortise 82 has a cross section that corresponds to that of tenon 74. Mortise 82 is within floor 20 and has interior sides 92 and 94 that are in sliding contact with corresponding surfaces of a cooperating tenon. Side 94 is normal to the plane of the floor. Side 94 lies on an acute angle $\beta$ that equals angle $\alpha$. The depth of the mortise is marginally greater than the corresponding height of a cooperating tenon.

The foregoing discussion was in regard to a conventional tape cassette. It will be understood that the size and shape of the holders may be adapted for receiving a number of different shaped cartridges, such as eight-track.

While the basic principle of this invention has been illustrated along with the preferred embodiment, it will be appreciated by those skilled in the art that variations in the disclosed arrangement, both as to its details and as to the organization of such details, may be made without departing from the spirit and scope of the appended claims. Accordingly, it is intended that the foregoing disclosure and the drawings should not necessarily be considered limiting.

What is claimed is:

1. A holder for tape cassettes comprising:
   (a) a plurality of side-by-side compartments, each for receiving and storing a tape cassette, each compartment having an entrance;
   (b) pivot means in each compartment for engaging the tape cassette;
   (c) spring means in each compartment for bearing against a wall of the cassette and urging the cassette against the holder while the cassette is in a stored position and for bearing on the back of the cassette to urge the cassette outwardly of the compartment in an alternate, partially withdrawn position, the wall being different from the back, the spring means and the pivot means cooperating to aid in effecting canting of the cassestte from the stored position to the partially withdrawn position upon the application of a force on the cassette by a user of the holder that cants the cassette outwardly with a corner of the cassette free of the compartment.

2. The holder claimed in claim 1 wherein the spring means comprises a leaf spring at the top of each compartment positioned to bear on the top of a cassette in the cassette stored position, and against the back of the cassette in the cassette partially withdrawn position, the top of the cassette being the wall.

3. The holder claimed in claim 1 including an upstanding step at the entrance to each compartment, the step preventing the bottom of a cassette from translating out of the compartment.

4. The holder claimed in claim 1 wherein each compartment has a back wall, a floor, a roof, and an interior barrier between the compartment and an adjacent one of the compartments, the barrier comprising a bottom barrier extending from the entrance to the back of the compartment and upwardly from the floor to a termination well below the roof, a back barrier extending partially from the back wall of the compartment towards the entrance, and an upper barrier extending from the back wall and roof towards the entrance, the bottom barrier being for guiding a cassette into and out of the compartment, the rear barrier presenting sideways constraint to a cassette along its length, and the upper barrier presenting a constraint to the top of the cassette when it is in the alternate, partially withdrawn position.

5. The holder claimed in claim 4 wherein the spring means comprises a leaf spring at the top of each compartment positioned to bear on the top of a cassette in the cassette stored position, the top of the cassette being the wall.

6. The holder claimed in claim 5 including an upstanding step at the entrance to each compartment, the step preventing the bottom of a cassette from translating out of the compartment.

7. The holder claimed in claim 1 wherein each compartment has a pocket in its back wall towards the bottom of the compartment to provide clearance for a cassette during and the pivot means is located adjacent the pocket and above the bottom of the compartment to engage a cassette and effect its canting upon the application of the force by the user pushing inwardly along a line below the pivot means, the back wall of the compartment having a section extending above the pocket and joining the pocket at a junction.

8. The holder claimed in claim 7 wherein the pivot means is defined by an edge of the back wall at the junction between the pocket and the back wall section that extends upward from the pocket.

9. The holder claimed in claim 4 wherein each compartment has a pocket in its back wall towards the bottom of the compartment to provide clearance for a cassette during canting and the pivot means is located adjacent the pocket and above the bottom of the compartment to engage a cassette and effect its canting upon the application of the force by the user pushing inwardly along a line below the pivot means, the back wall of the compartment having a section extending above the pocket and joining the pocket at a junction.

10. The holder claimed in claim 6 wherein each compartment has a pocket in its back wall towards the bottom of the compartment to provide clearance for a cassette during canting and the pivot means is located adjacent the pocket and above the bottom of the compartment to engage a cassette and effect its canting upon the application of the force by the user pushing inwardly along a line below the pivot means, the back wall of the compartment having a section extending above the pocket and joining the pocket at a junction.

11. The holder claimed in claim 7 wherein the holder is rectangular parallelepiped and including interconnecting means comprising:

mortise means and tenon means, the mortise means comprising at least one mortise and the tenon means comprising at least one tenon that together form a pair, such mortise and tenon being located on opposite outer walls of the holder and being adapted for engaging a corresponding interconnecting means of another of the holders.

12. The holder of claim 11 wherein the mortise means comprises two mortises on one outer wall and two mortises on an adjacent outer wall and wherein the tenon means comprises two tenons on each of the other outer walls, the mortises and tenons being parallel and being adapted for engaging respective tenon and mortise means of another holder.

* * * * *